United States Patent
Uemura

(10) Patent No.: US 12,133,268 B2
(45) Date of Patent: Oct. 29, 2024

(54) TERMINAL APPARATUS, BASE STATION APPARATUS, AND RADIO COMMUNICATION METHOD

(71) Applicant: SOFTBANK CORP., Tokyo (JP)

(72) Inventor: Katsunari Uemura, Tokyo (JP)

(73) Assignee: SOFTBANK CORP., Tokyo (JP)

(*) Notice: Subject to any disclaimer, the term of this patent is extended or adjusted under 35 U.S.C. 154(b) by 144 days.

(21) Appl. No.: 17/426,284

(22) PCT Filed: Feb. 14, 2019

(86) PCT No.: PCT/JP2019/005458
§ 371 (c)(1),
(2) Date: Jul. 28, 2021

(87) PCT Pub. No.: WO2020/157994
PCT Pub. Date: Aug. 6, 2020

(65) Prior Publication Data
US 2021/0392701 A1      Dec. 16, 2021

(30) Foreign Application Priority Data

Jan. 29, 2019   (JP) ................................ 2019-012915

(51) Int. Cl.
*H04W 28/02*    (2009.01)
*H04W 52/24*    (2009.01)
(Continued)

(52) U.S. Cl.
CPC ... *H04W 74/0841* (2013.01); *H04W 28/0278* (2013.01); *H04W 52/242* (2013.01); *H04W 80/02* (2013.01)

(58) Field of Classification Search
CPC ......... H04W 74/0841; H04W 28/0278; H04W 52/242; H04W 80/02; H04W 28/02; H04W 74/0833
See application file for complete search history.

(56) References Cited

U.S. PATENT DOCUMENTS

2015/0319638 A1* 11/2015 Rune .................... H04W 72/12
                                                                    370/229
2018/0199381 A1    7/2018 Rong et al.
(Continued)

FOREIGN PATENT DOCUMENTS

JP    2017-163519 A    9/2017
WO    2018/135640 A1    7/2018

OTHER PUBLICATIONS

MediaTek (2-Step RACH msgA and msgB contents), Nov. 2018.*
(Continued)

*Primary Examiner* — Lakeram Jangbahadur

(57) ABSTRACT

A terminal apparatus executing radio communication with a base station apparatus, the terminal apparatus: transmits a first message, including a random access preamble and identification information of the terminal apparatus, for starting a random access procedure to the base station apparatus; receives a second message, including a random access response to the first message, from the base station apparatus; and selects one random access preamble group from among a plurality of random access preamble groups on the basis of a first condition, a second condition, a third condition, and a status of the terminal apparatus, in order to notify the base station apparatus of the status of the terminal apparatus when transmitting the first message. Consequently, even when a 2-step random access procedure is adopted, radio resources for the radio communication between the base station apparatus and the terminal apparatus can be used efficiently.

2 Claims, 11 Drawing Sheets

| | Case | LCH | LCID | Data size (X) | Pathloss(Y) | Preamble |
|---|---|---|---|---|---|---|
| 1 | RRC message (SIZE: LARGE) | CCCH | 0 (CCCH of size 64 bits) | $X > Size\_gA$ | – | GROUP B |
| 2 | RRC message (SIZE: SMALL) | CCCH | 52 (CCCH of size 48 bits) | $X \leq Size\_gA$ | – | GROUP A |
| 3 | Potential UL data (SIZE: LARGE) | Other than CCCH | BSR | – | $Y \geq TH\_pl$ | GROUP B |
| 4 | Potential UL data (SIZE: SMALL) | Other than CCCH | BSR | – | $Y < TH\_pl$ | GROUP A |
| 5 | Potential UL data (TRANSMISSION COMPLETED) | Other than CCCH | (1-32) | zero | – | GROUP C |

(51) Int. Cl.
*H04W 74/0833* (2024.01)
*H04W 80/02* (2009.01)

(56) References Cited

U.S. PATENT DOCUMENTS

| | | | | |
|---|---|---|---|---|
| 2018/0227805 | A1* | 8/2018 | Jang | H04W 36/0055 |
| 2018/0302929 | A1* | 10/2018 | Takahashi | H04W 74/006 |
| 2019/0342921 | A1* | 11/2019 | Loehr | H04L 5/0053 |
| 2019/0373642 | A1* | 12/2019 | Suzuki | H04W 74/0833 |
| 2020/0015236 | A1* | 1/2020 | Kung | H04B 7/04 |

OTHER PUBLICATIONS

3GPP, 3GPP Standards "TS 38.321v15.4.0(Dec. 2018)", Oct. 2018.
3GPP, 3GPP Contribution "R2-1818504", Nov. 2018.
3GPP, 3GPP Contribution "R2-1816685", Nov. 18, 2018.
3GPP, Ericsson, Correction for preamble group A or B seletion [online], 3GPP TSG WG2#103bis R2-1814789, Oct. 2018.

* cited by examiner

Fig. 7

| | Case | LCH | Data size (X) | Pathloss (Y) | Preamble |
|---|---|---|---|---|---|
| 1 | RRC message (SIZE: LARGE) | CCCH | $X > Size\_gA$ | — | GROUP B |
| 2 | RRC message (SIZE: SMALL) | CCCH | $X \leqq Size\_gA$ | — | GROUP A |
| 3 | Potential UL data (SIZE: LARGE) | Other than CCCH | $X > Size\_gA$ and $Y \geqq TH\_pl$ | | GROUP B |
| 4 | Potential UL data (SIZE: SMALL) | Other than CCCH | $X \leqq Size\_gA$ or $Y < TH\_pl$ | | GROUP A |
| 5 | Potential UL data (TRANSMISSION COMPLETED) | Other than CCCH | zero | — | GROUP C |

Fig. 9

| | Case | LCH | LCID | Data size (X) | Pathloss(Y) | Preamble |
|---|---|---|---|---|---|---|
| 1 | RRC message (SIZE: LARGE) | CCCH | 0 (CCCH of size 64 bits) | X>Size_gA | — | GROUP B |
| 2 | RRC message (SIZE: SMALL) | CCCH | 52 (CCCH of size 48 bits) | X≦Size_gA | — | GROUP A |
| 3 | Potential UL data (SIZE: LARGE) | Other than CCCH | BSR | — | Y≧TH_pl | GROUP B |
| 4 | Potential UL data (SIZE: SMALL) | Other than CCCH | BSR | — | Y<TH_pl | GROUP A |
| 5 | Potential UL data (TRANSMISSION COMPLETED) | Other than CCCH | (1~32) | zero | — | GROUP C |

TERMINAL APPARATUS, BASE STATION APPARATUS, AND RADIO COMMUNICATION METHOD

TECHNICAL FIELD

The present invention relates to a terminal apparatus, a base station apparatus, and a radio communication method.

BACKGROUND ART

The 3GPP (Third Generation Partnership Project), which is an international standardizing body, has been examining NR (New Radio), which is a new radio access technology for the $5^{th}$ generation cellular communication system. Regarding NR, technology for enabling realization of more various kinds of services than the LTE (Long Term Evolution)-Advanced for the $4^{th}$ generation cellular communication system is being examined. For example, the following usage scenarios for different intended uses are defined as implementation requirements for NR: eMBB (enhanced Mobile Broad Band) for realizing high-speed and large-capacity communications; URLLC (Ultra-Reliable and Low Latency Communication) for realizing ultra-reliable and low latency communications; and mMTC (massive Machine Type Communication) for realizing a large number of simultaneous connections by IoT (Internet of Things) devices.

In a radio communication system, a random access procedure is prepared as an initial access procedure from a non-scheduled terminal apparatus. NPL1 defines the random access procedure in NR. In the random access procedure, a terminal apparatus can notify a base station apparatus of an uplink data size by using grouped random access preambles. Specifically speaking, the terminal apparatus has a function that selects a random access preamble group on the basis of the uplink data size to be transmitted. NPL2 and NPL3 suggest a new procedure with a reduced number of steps (hereinafter referred to as a "2-step random access procedure") as compared to a conventional 4-step random access procedure.

CITATION LIST

Patent Literature

NPL1: 3GPP Standards "TS 38.321v15.4.0(2018-12)"
NPL2: 3GPP Contribution "R2-1818504"
NPL3: 3GPP Contribution "R2-1816685"

SUMMARY OF THE INVENTION

Technical Problem

In this circumstance, the 2-step random access procedure includes a random access procedure for transmitting/receiving both a random access preamble for step 1 (Message 1) and uplink data for step 3 (Message 3) in the conventional 4-step random access procedure, as Message A (MSG-A). Moreover, the 2-step random access procedure includes a random access procedure for transmitting/receiving both a random access response for step 2 (Message 2) and downlink data for step 4 (Message 4) in the conventional 4-step random access procedure, as Message B (MSG-B). Furthermore, in the 4-step random access procedure, a preamble group (random access preamble group) to which the random access preamble for step 1 (Message 1) belongs is selected on the basis of a data size to be transmitted in Message 3 and reception quality.

However, in the 2-step random access procedure, the uplink data which is transmitted in Message 3 in the 4-step random access procedure is transmitted as part of MSG-A. Accordingly, in the 2-step random access procedure, the uplink data size of Message 3 cannot be reported in advance by using the random access preamble group. Therefore, if data transmission continues even after the transmission of MSG-A, the base station apparatus does not have any functions of obtaining information indicating to what amount of uplink radio resources should be allocated to the terminal apparatus. Consequently, an excessively small or large amount of the radio resources may potentially be allocated comparing to an actual necessary radio resources and there is the risk that the efficiency of the radio resource utilization may degrade.

So, it is an object of the present invention to provide a technology capable of efficiently for the radio resource utilization in the radio communication between the base station apparatus and the terminal apparatus even in a case the 2-step random access procedure is adopted.

Solution to Problem

A terminal apparatus according to an aspect of the present invention is a terminal apparatus executing radio communication with a base station apparatus, the terminal apparatus: transmits a first message, including a random access preamble and identification information of the terminal apparatus, for initiating a random access procedure to the base station apparatus; receives a second message, including a random access response to the first message, from the base station apparatus; and selects one random access preamble group from among a plurality of random access preamble groups on the basis of a first condition, a second condition, a third condition, and a status of the terminal apparatus in order to notify the base station apparatus of the status of the terminal apparatus when transmitting the first message.

A base station apparatus according to an aspect of the present invention is a base station apparatus executing radio communication with a terminal apparatus, the base station apparatus: receives a first message, including a random access preamble and identification information of the terminal apparatus, for initiating a random access procedure, from the terminal apparatus; transmits a second message, including a random access response to the first message, to the terminal apparatus; and selects one random access preamble group from among a plurality of random access preamble groups and transmits, to the terminal apparatus, information indicating a first condition, a second condition, and a third condition, which are used by the terminal apparatus that notifies the base station apparatus of a status of the terminal apparatus.

Advantageous Effects of the Invention

In the 2-step random access procedure, the terminal apparatus can notify the base station apparatus of a data size to be transmitted from the terminal apparatus during the random access procedure according to the present invention. Therefore, even in the case that the 2-step random access procedure is adopted, the radio resources for the radio communication between the base station apparatus and the terminal apparatus can be used efficiently.

BRIEF DESCRIPTION OF DRAWINGS

FIG. 7 is an explanatory diagram illustrating an example of a method for selecting a random access preamble group according to the first embodiment of the present invention;

FIG. 9 is an explanatory diagram illustrating an example of a method for selecting a random access preamble group according to a third embodiment of the present invention;

DESCRIPTION OF EMBODIMENTS

Figure 1:
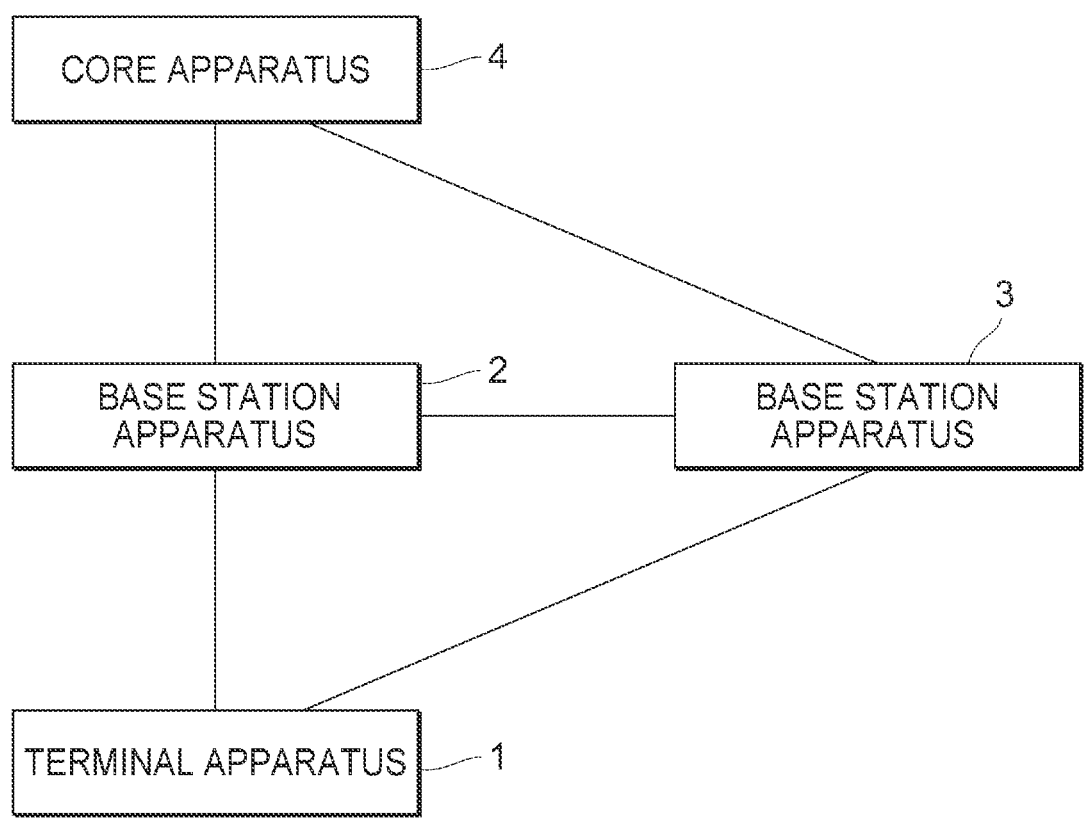
FIG. 1 is a schematic configuration diagram illustrating an example of the configuration of a radio communication system according to a first embodiment of the present invention.

Embodiments of the present invention will be explained with reference to the attached drawings. The embodiments explained below are just for illustrative purposes to explain the present invention and are not intended to limit the present invention only to the embodiments. Also, the present invention can be implemented in various variations unless they depart from the gist of the invention. Furthermore, the same reference numerals are assigned to the same constituent elements to the extent possible in the respective drawings and any redundant explanation is omitted.

An explanation will be provided about a radio communication system and a radio network according to an embodiment of the present invention. The radio communication system according to the embodiment of the present invention is targeted at NR (5G: Fifth Generation), but it is not limited to this NR. For example, the present invention can be also applied to LTE or LTE-Advanced. Also, it can be applied to a radio communication system which uses NR in part of the radio communication system. Furthermore, the present invention can be applied to a radio communication system as long as it is a radio communication system including at least a terminal apparatus and a base station apparatus; and the present invention can be also applied to future radio communication systems. Incidentally, LTE and LTE-Advanced will be hereinafter also referred to as E-UTRA (Evolved Universal Terrestrial Radio Access), but they mean the same thing.

An area (cover area) formed by the base station apparatus is called a cell and each of the E-UTRA and the 5G is a cellular communication system constructed by a plurality of cells. Either a TDD (Time Division Duplex) method or an FDD (Frequency Division Duplex) method may be applied as a radio communication system relating to the present invention and different methods may be applied to the respective cells.

FIG. 1 is a schematic configuration diagram illustrating an example of the configuration of a radio communication system according to a first embodiment of the present invention. A terminal apparatus 1 is wirelessly connected to a base station apparatus 2 or a base station apparatus 3. Moreover, the terminal apparatus 1 may be wirelessly connected to the base station apparatus 2 and the base station apparatus 3 at the same time. The base station apparatus 2 and the base station apparatus 3 can use the E-UTRA or the 5G. For example, the base station apparatus 2 may use the 5G and the base station apparatus 3 may use the E-UTRA, or vice versa. A base station apparatus in the E-UTRA is called eNB (evolved NodeB); and a base station apparatus in the NR is called gNB (g-NodeB). When the term "base station apparatus" is used hereinafter, it includes the meanings of both eNB and gNB. Also, a terminal apparatus in the E-UTRA and the NR will be referred to as UE (User Equipment). The base station apparatus gNB in the NR may connect to the terminal apparatus by using part of a frequency bandwidth used by the base station apparatus gNB (BWP: Carrier bandwidth Part). When the term "cell" is used, it includes BWP. Referring to FIG. 1, the radio communication system includes one terminal apparatus 1; however, it may include two or more terminal apparatuses 1.

The terminal apparatus 1 may be connected to, for example, the base station apparatus 2 (the base station apparatus 3) on a cell basis and may be connected by using a plurality of cells (carrier aggregation). If the terminal apparatus 1 is connected via a plurality of base station apparatuses (dual connectivity), a base station apparatus which is initially connected is called a master node (MN: Master Node) and a base station apparatus which is additionally connected is called a secondary node (SN: Secondary Node). The base station apparatuses are inter-connected by a base station interface. Moreover, the base station apparatus 2 (the base station apparatus 3) and a core apparatus 4 are connected by a core interface. The base station interface is used for, for example, exchanging a control signal required for handover or cooperative operation between the base station apparatuses. The core apparatus 4 involves, for example, the base station apparatus 2 (the base station apparatus 3) under its control and mainly handles load control among the base station apparatuses and mobility control such as calling (paging) and location registration of the terminal apparatus 1.

The terminal apparatus 1 and the base station apparatus 2 (the base station apparatus 3) transmit/receive, in radio resource control (RRC: Radio Resource Control) layer, an RRC message. Moreover, the terminal apparatus 1 and the base station apparatus 2 (the base station apparatus 3) transmit/receive, in medium access control (MAC: Medium Access Control) layer, a MAC control element (MAC CE: MAC Control Element). The RRC message is transmitted as an RRC PDU (Protocol Data Unit) and the following logical channels (LCH: Logical Channel) are used for mapping to the RRC PDU: a common control channel (CCCH: Common Control Channel), a dedicated control channel (DCCH: Dedicated Control Channel), a paging control channel (PCCH: Paging Control Channel), a broadcast control channel (BCCH: Broadcast Control Channel), or a multicast control channel (MCCH: Multicast Control Channel). The MAC CE is transmitted as a MAC PDU (or MAC subPDU). The MAC subPDU is equivalent to a service data unit (SDU: Service Data Unit), to which, for example, an 8-bit header is added, in a MAC layer; and the MAC PDU includes one or more MAC subPDUs.

An explanation will be provided about physical channels and physical signals relating to this embodiment. For the physical channels relating to the embodiment of the present invention, an explanation will be provided below about a physical broadcast channel (PBCH: Physical Broadcast Channel), a physical random access channel (PRACH: Physical Random Access Channel), a physical downlink control channel (PDCCH: Physical Downlink Control Channel), and a physical uplink shared channel (PUSCH: Physical Uplink Shared Channel). Incidentally, in the radio communication system according to the embodiment, at least the following other signals and channels exist: synchronization signals (Primary Synchronization Signal; Secondary Synchronization Signal), a physical uplink control channel (PUCCH: Physical Uplink Control Channel), a physical downlink shared channel (PDSCH: Physical Downlink Shared Channel), a scheduling reference signal (SRS: Scheduling Reference Signal), and a demodulation reference signal (DMRS: Demodulation Reference Signal); however, any detailed explanation about them is omitted.

Physical Broadcast Channel PBCH

The physical broadcast channel PBCH is transmitted from the base station apparatus to the terminal apparatus and is used to inform common parameters (broadcast information and system information) in the cells under the control of the base station apparatus. The system information is further classified into master information blocks (MIB) and system information blocks (SIB). Incidentally, the system information blocks are further subdivided into SIB1, SIB2, and so on and are then transmitted. The system information includes information which is required for connection to the cell or the like; and, for example, the MIB includes a system frame number, information whether it can be camped to the cell or the like. Furthermore, SIB1 includes, for example, a parameter for calculating the quality of cells (a cell selection parameter), channel information which is used in common within the cell (random access control information, PUCCH control information, and PUSCH control information), or scheduling information of other system information.

Physical Random Access Channel PRACH

The physical random access channel PRACH is used to transmit a random access preamble(s). The PRACH is generally used in a state where uplink synchronization with the base station apparatus is not established; and is used for transmission timing adjustment information (timing advance) and an uplink radio resource request(s). Radio resources available for the random access preamble(s) transmission are transmitted to the terminal apparatus by using the broadcast information.

Physical Downlink Control Channel PDCCH

The physical downlink control channel PDCCH is transmitted from the base station apparatus in order to notify the terminal apparatus of downlink control information (DCI: Downlink Control Information). The downlink control information includes uplink radio resource information (uplink grant (UL grant)) or downlink radio resource information (downlink grant (DL grant)) which can be used by the terminal apparatus. The downlink grant is information indicating scheduling of the physical downlink shared channel PDSCH. The uplink grant is information indicating scheduling of the physical uplink shared channel PUSCH. When the PDCCH is transmitted as a response to the PRACH (random access preamble), the PDSCH indicated by the PDCCH is a random access response and includes index information of the random access preamble, transmission timing adjustment information, uplink grant, and so on.

Physical Uplink Shared Channel PUSCH

The physical uplink shared channel PUSCH is transmitted from the terminal apparatus in order to notify the base station apparatus of uplink data (user data) or uplink control data (RRC message). The PUSCH can include downlink reception quality and control signals for physical layers such as ACK/NACK. Moreover, when the terminal apparatus transmits the PUSCH corresponding to the uplink grant included in the random access response, the PUSCH includes information (Message 3) of the terminal apparatus related to the random access.

Figure 2:
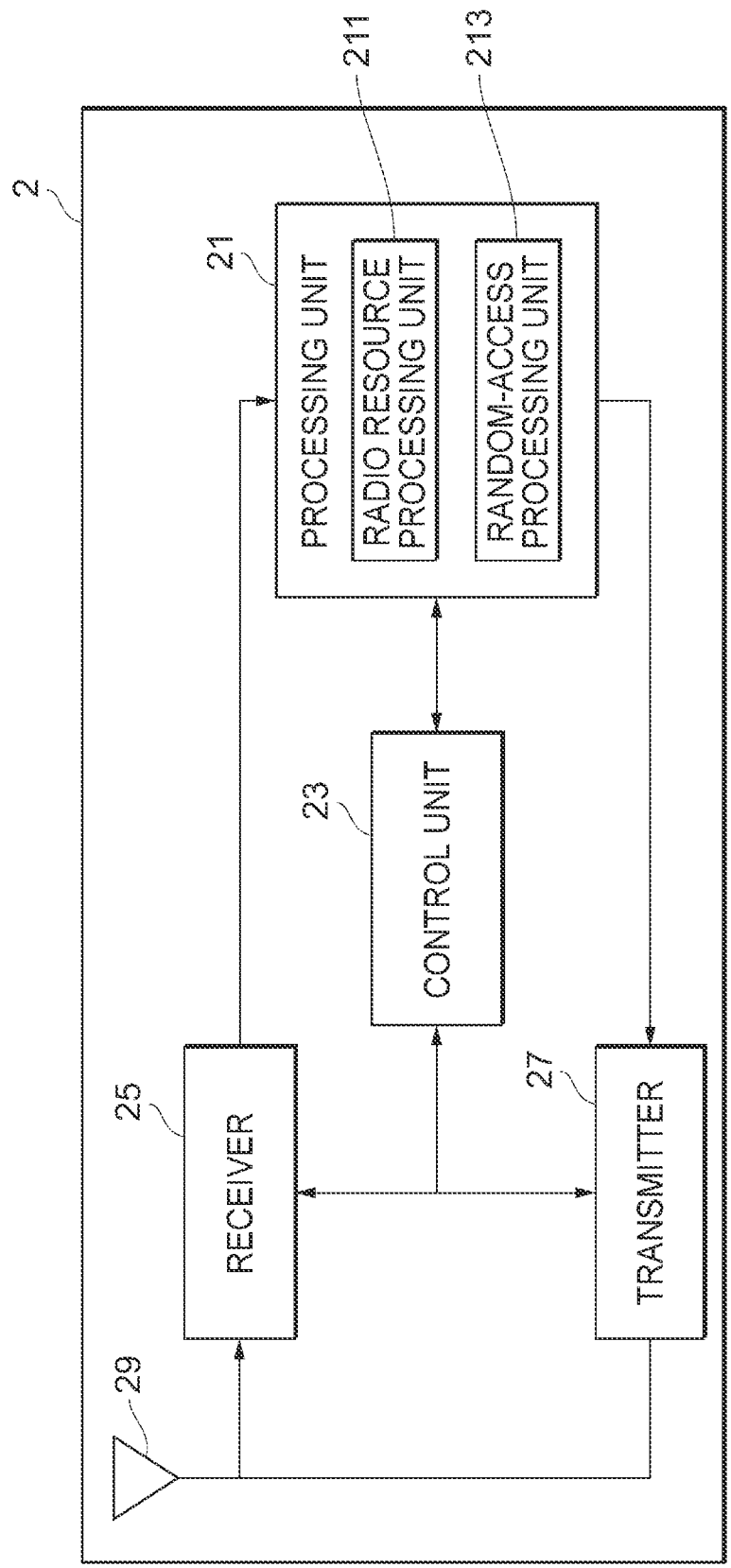
FIG. 2 is a schematic configuration diagram illustrating an example of the configuration of a base station apparatus according to the first embodiment of the present invention.

FIG. 2 is a schematic configuration diagram illustrating an example of the configuration of a base station apparatus according to the first embodiment of the present invention. The base station apparatus 2 is illustratively configured, as illustrated in FIG. 2, by including a processing unit 21, a control unit 23, a receiver 25, a transmitter 27, and a transmission/reception antenna unit 29. The processing unit 21 is illustratively configured by including a radio resource processing unit 211 and a random-access processing unit 213.

The processing unit 21, for example, generates control information to control the receiver 25 and the transmitter 27 and outputs the control information to the control unit 23. The processing unit 21, for example, executes processing relating to radio resource control layer, packet data integration protocol (Packet Data Convergence Protocol: PDCP) layer, radio link control (Radio Link Control: RLC) layer, and medium access control layer.

The radio resource processing unit 211, for example, generates downlink data, RRC messages, and MAC control elements to be located in the physical downlink shared channel PDSCH and outputs them to the transmitter 27. Also, the radio resource processing unit 211 manages various kinds of configuration information for the terminal apparatus 1.

The random-access processing unit 213 executes random access control processing. For example, the random-access processing unit 213 generates commands and random access responses to the received random access preambles.

The control unit 23 generates a control signal for controlling the receiver 25 and the transmitter 27 on the basis of the control information from the processing unit 21.

The receiver 25 separates, demodulates, and decodes various kinds of signals received from the terminal apparatus 1 via the transmission/reception antenna unit 29 on the basis of the control signal which is input from the control unit 23. The receiver 25 outputs the decoded information to the processing unit 21. The receiver 25, for example, may measure an uplink channel status from the received uplink signals and output the measurement results to the processing unit 21.

The transmitter 27 generates, for example, a downlink reference signal on the basis of the control signal which is input from the control unit 23. The transmitter 27 transmits signals to the terminal apparatus 1 via the transmission/reception antenna unit 29 by, for example, encoding, modulating, and multiplexing various kinds of information input from the processing unit 21.

Figure 3:
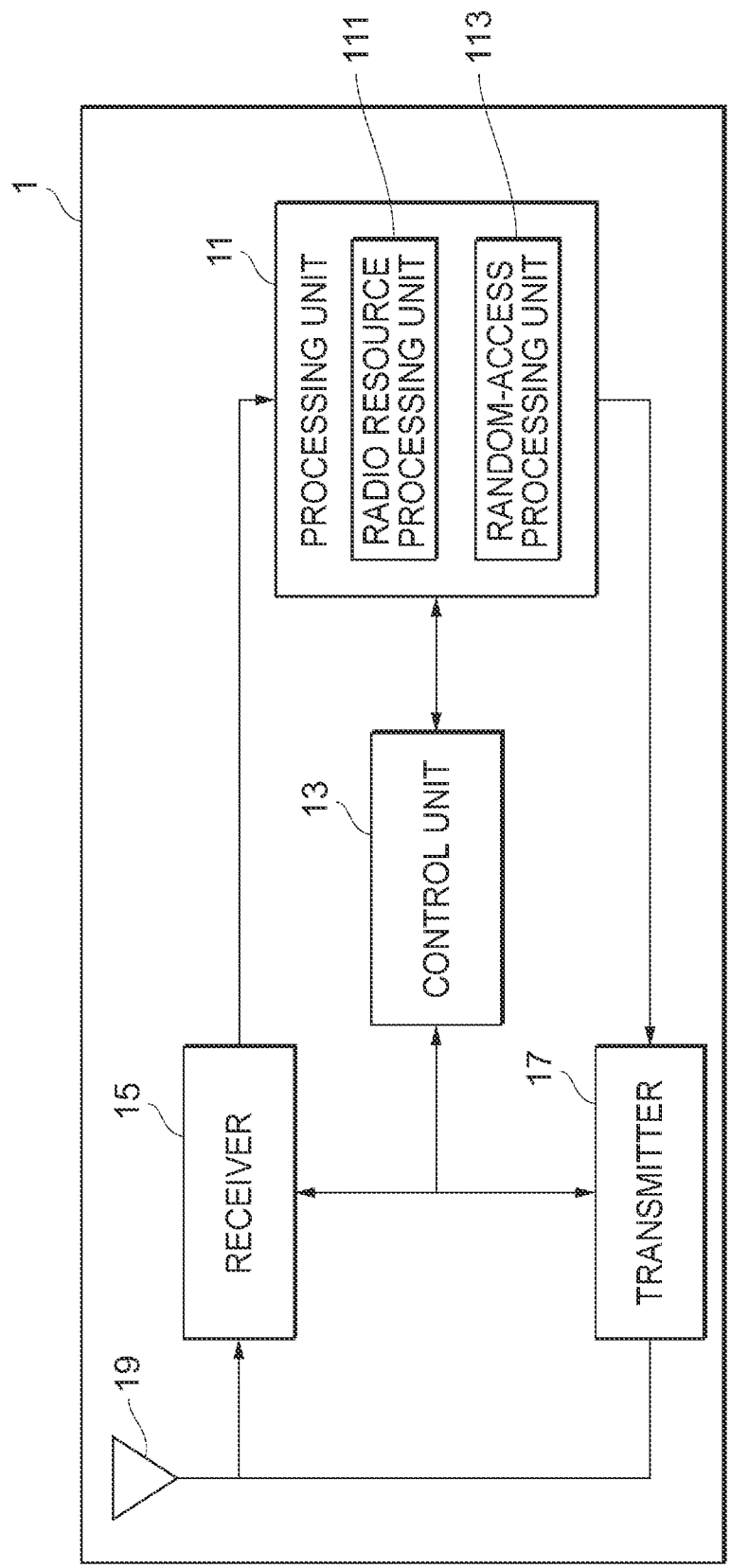
FIG. 3 is a schematic configuration diagram illustrating an example of the configuration of a terminal apparatus according to the first embodiment of the present invention.

FIG. 3 is a schematic configuration diagram illustrating an example of the configuration of a terminal apparatus according to the first embodiment of the present invention. The terminal apparatus 1 is configured, as illustrated in FIG. 3, by illustratively including a processing unit 11, a control unit 13, a receiver 15, a transmitter 17, and a transmission/reception antenna unit 19. The processing unit 11 is configured by illustratively including a radio resource processing unit 111 and a random-access processing unit 113.

The processing unit 11, for example, generates control information to control the receiver 15 and the transmitter 17 and outputs the control information to the control unit 13. The processing unit 11, for example, executes processing relating to radio resource control layers, packet data integration protocol layers, radio link control layers, and medium access control layers.

The radio resource processing unit 111 manages various kinds of setting information for the terminal apparatus 1. For example, the radio resource processing unit 111 generates information to be located in each physical uplink channel and outputs the information to the transmitter 17.

The random-access processing unit 113 executes random access control processing. For example, the random-access processing unit 113 initiates the random access procedure on the basis of an instruction from the radio resource processing unit 111 or an instruction received from the base station apparatus 2 or the base station apparatus 3 to initiate the random access procedure.

The control unit 13 generates a control signal for controlling the receiver 15 and the transmitter 17 on the basis of the control information from the processing unit 11.

The receiver 15 separates, demodulates, and decodes various kinds of information received from the base station apparatus 2 or the base station apparatus 3 via the transmission/reception antenna unit 19 on the basis of the control signal from the control unit 13. The receiver 15 transfers the decoded information to the processing unit 11.

The transmitter 17 generates a physical uplink signal on the basis of the control signal from the control unit 13 and, for example, encodes and modulates a physical uplink signal or physical uplink channel which is input from the processing unit 11. The transmitter 17 multiplexes the various kinds of signals and transmits them to at least either the base station apparatus 2 or the base station apparatus 3 via the transmission/reception antenna unit 19.

Random Access Procedure

The random access procedure includes: a contention-based random access (CB-RA: Contention-based Random Access) which may possibly cause contention between terminal apparatuses; and a non-contention-based random access (NC-RA: Non-Contention-based Random Access) which can avoid the contention. The CB-RA may occur when different terminal apparatuses select the same random access preamble. On the other hand, the NC-RA is a random access procedure which does not cause the occurrence of contention as the base station apparatus coordinates a random access preamble to be used by the terminal apparatus in advance. The NC-RA is used when performing a handover procedure or the like.

Figure 4:
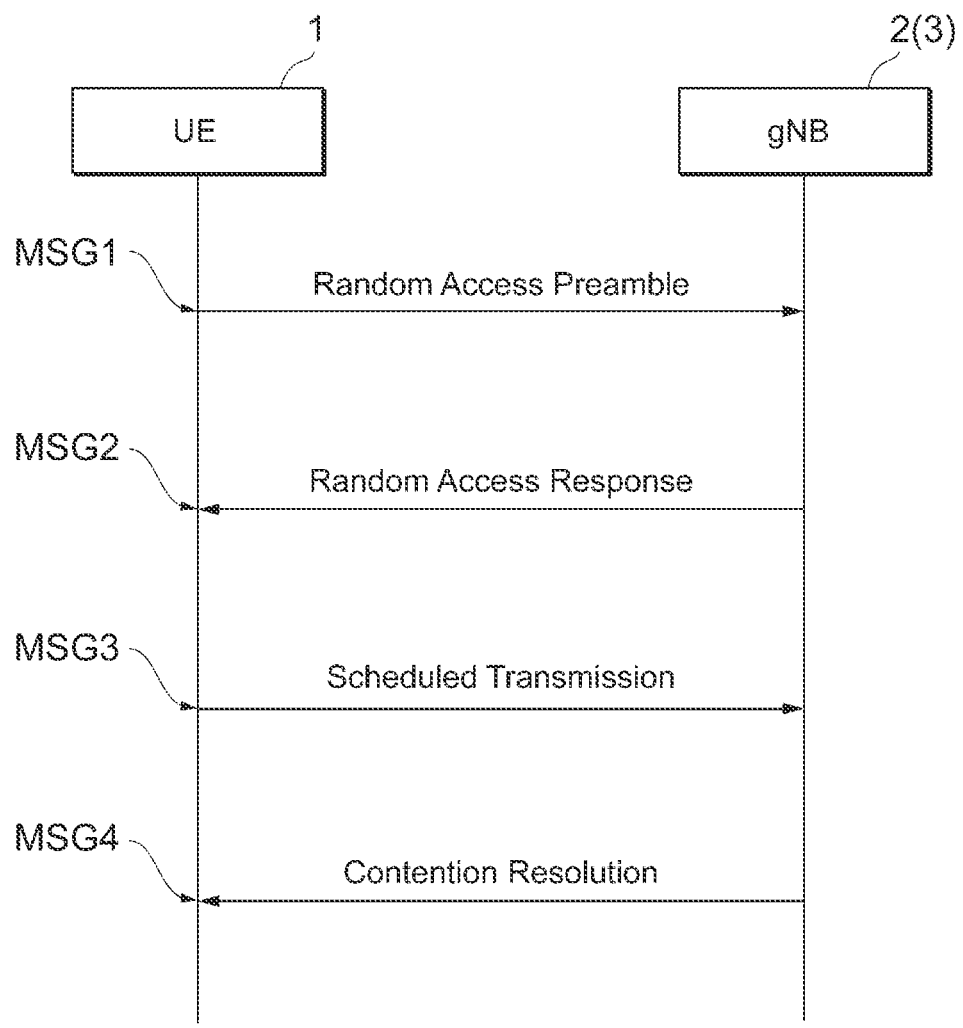
FIG. 4 is an explanatory diagram illustrating an example of the 4-step random access procedure according to the first embodiment of the present invention.

The 4-step random access procedure will be explained with reference to FIG. 4. FIG. 4 is an explanatory diagram illustrating an example of the 4-step random access procedure according to an embodiment of the present invention. Referring to FIG. 4, UE represents the terminal apparatus 1 and gNB represents the base station apparatus 2(3). The terminal apparatus transmits a random access preamble (Random Access Preamble) via Message 1 (MSG1). The base station apparatus which has detected the random access preamble transmits a random access response (RAR: Random Access Response) via Message 2 (MSG2). The random access response includes index information of the detected random access preamble, and transmission timing adjustment information and an uplink grant which are required for the next transmission (Message 3, MSG3). If the index information of the random access preamble which is reported by the random access response matches the random access preamble selected by the terminal apparatus itself, the terminal apparatus adjusts uplink transmission timing based on the transmission timing adjustment information and transmits Message 3 (Scheduled Transmission) based on the uplink grant. The terminal apparatus includes a terminal apparatus identifier (UE-ID) for identifying the terminal apparatus itself in Message 3. The base station apparatus transmits a contention resolution identifier (Contention Resolution ID) corresponding to the UE-ID transmitted via Message 3, via Message 4 (MSG4) in order to identify the terminal apparatus, and resolves resource contention after that. Message 4 is also called a contention resolution message (Contention Resolution).

Figure 5:
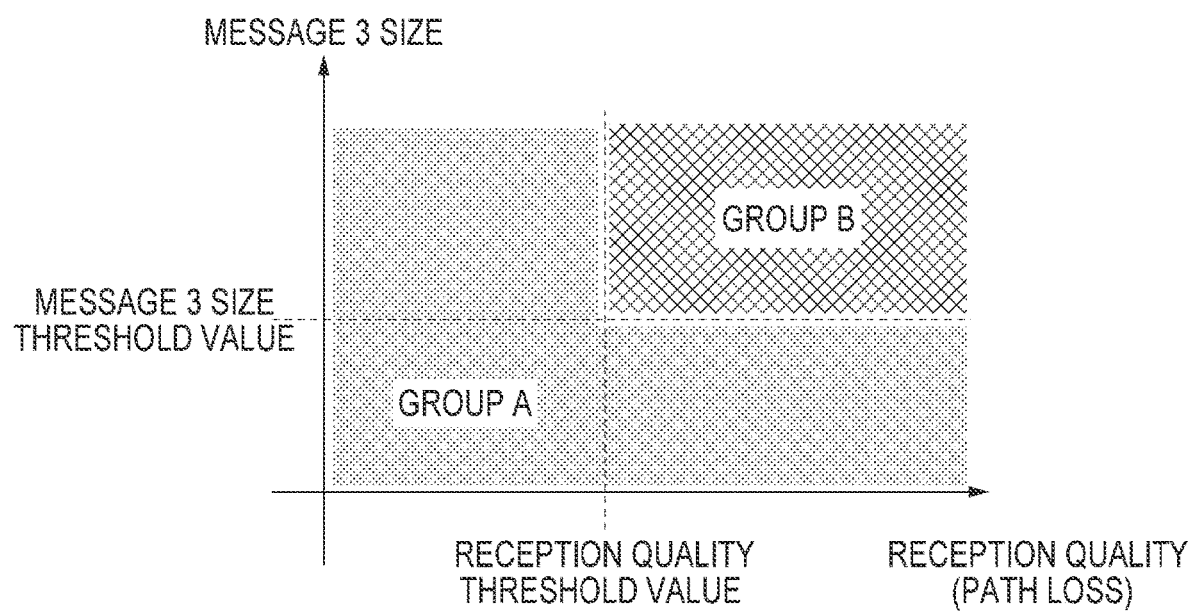
FIG. 5 is an explanatory diagram illustrating an example of random access preamble groups according to the first embodiment of the present invention.

FIG. 5 is an explanatory diagram illustrating an example of a random access preamble group according to an embodiment of the present invention. Random access preamble transmitted via MSG1 is selected by the terminal apparatus. Random access preambles may be classified into random access preamble Groups NB by the base station apparatus. The random access preamble Groups NB will be hereinafter abbreviated as Groups NB. Group B indicates a group of random access preambles selected based on the size of data to be transmitted and measurement quality (path loss). Group A always exists regardless of whether configuration of Group B exist or not.

Under this circumstance, Procedure X which is one example of the random access procedure will be explained. One example of Procedure X by the terminal apparatus is given the Message 3 (MSG3) is not transmitted and Group B is set from the base station apparatus. The terminal apparatus selects Group B when (1) the data size transmitted via MSG3 is larger than a MSG3 size threshold value and a path loss value is smaller than a value of the result of a defined calculation formula. Alternatively, the terminal apparatus selects Group B when (2) the random access procedure is initiated in order to transmit an RRC message which uses the CCCH and the size of a CCCH SDU (a total amount of the CCCH SDU and a header) is larger than the MSG3 size threshold value.

On the other hand, in a case other than the above-mentioned cases, the terminal apparatus selects Group A. Incidentally, when Group B is not configured, the terminal apparatus selects Group A.

Procedure X

2> if Msg3 has not yet been transmitted:
   3> if Random Access Preambles group B is configured:
      4> if the potential Msg3 size (UL data available for transmission plus MAC header and, where required, MAC CEs) is greater than ra-Nsg3SizeGroupA and the pathloss is less than PCNAX (of the Serving Cell performing the Random Access Procedure)−preambleReceivedTargetPower−msg3-DeltaPreamble−messagePowerOffsetGroupB; or 4> if the Random Access procedure was initiated for the CCCH logical channel and the CCCH SDU size plus MAC subheader is greater than ra-Msg3SizeGroupA:

5> select the Random Access Preambles group B.

4> else:

5> select the Random Access Preambles group A.

3> else:

4> select the Random Access Preambles group A.

The MSG3 size threshold value is ra-Msg3SizeGroupA. The defined calculation formula is PCMAX−preambleReceivedTargetPower−msg3-DeltaPreamble−messagePowerOffsetGroupB. These parameters used in the calculation formula are broadcasted from the base station apparatus to the terminal apparatus in advance by using broadcast information or an RRC message.

In the NR, an RRCSetupRequest message, an RRCReestablishmentRequest message, an RRCResumeRequest message, and an RRCSystemInfoRequest message are defined as uplink RRC messages using the CCCH.

Figure 6:
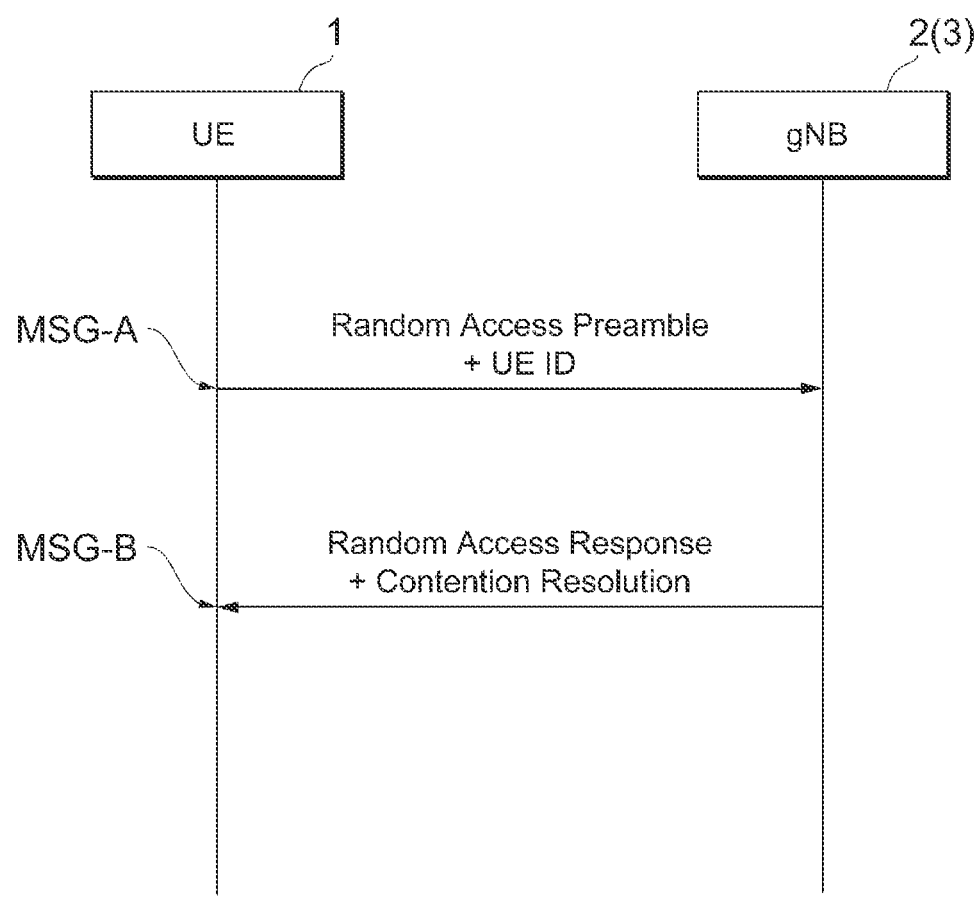
FIG. 6 is an explanatory diagram illustrating an example of the 2-step random access procedure according to the first embodiment of the present invention.

An example of the 2-step random access procedure according to an embodiment of the present invention will be explained with reference to FIG. 6. FIG. 6 is an explanatory diagram illustrating an example of the 2-step random access procedure according to the embodiment of the present invention. The terminal apparatus transmits Message A (MSG-A) in step 1 as illustrated in FIG. 6. Moreover, the terminal apparatus receives Message B (MSG-B) in step 2. MSG-A includes Message 1 (random access preamble) and the information transmitted via Message 3 (for example, UE-ID [identification information of the terminal apparatus]) in the 4-step random access procedure illustrated in FIG. 4. MSG-B includes the information (for example, the timing adjustment information) transmitted via Message 2 (random access response) and the information (for example, the contention resolution ID) transmitted via Message 4 in the 4-step random access procedure illustrated in FIG. 4.

Embodiment 1

The terminal apparatus according to Embodiment 1 is configured to select, when selecting a random access preamble group in the 2-step random access procedure, the random access preamble group on the basis of not the data size of Message 3, but a data buffer volume retained by the terminal apparatus after transmitting MSG-A. Specifically speaking, if the data to be transmitted is not the CCCH SDU, the terminal apparatus according to Embodiment 1 compares the (data buffer volume)−(a data volume which can be transmitted via MSG-A) with the threshold value and selects a random access preamble group, and selects a random access preamble from that random access preamble group. Incidentally, if the data to be transmitted is the CCCH SDU (RRC message), the base station apparatus can estimate an uplink resource size which is required to complete the RRC procedure and, therefore, a method for calculating the data volume does not have to be changed from a conventional method; however, the random access preamble may be selected according to the aforementioned method.

FIG. 7 is an explanatory diagram illustrating an example of a method for selecting the random access preamble group according to the embodiment of the present invention. If the terminal apparatus activates the 2-step random access procedure, it calculates the data buffer volume which is retained and has not been transmitted (including, for example, the data buffer volume after transmitting MSG-A, the header information, and the MAC CE), and the data volume which can be transmitted via MSG-A, and the path loss value. For example, if both Condition A1 requiring that (data size (X)=(data buffer volume)−(the data volume which can be transmitted via MSG-A)) is equal to or larger than a threshold value (Size_gA), and Condition A2 requiring that the path loss value (TH_pl) is smaller than a specified calculation result (Pathloss(Y)) are fulfilled, the terminal apparatus selects Group B.

Moreover, for example, if Condition A1 is fulfilled, that is, if the (data size(X)=(data buffer volume)−(data volume which can be transmitted via MSG-A)) is smaller than the threshold value (Size_gA), or if Condition A2 is fulfilled, that is, if the path loss value (TH_pl) is equal to or larger than the specified calculation result (Pathloss(Y)), the terminal apparatus selects Group A. Incidentally, the phrase "equal to or larger than" in each of the above conditions may be replaced with "larger than" or the phrase "smaller than" may be replaced with "equal to or smaller than." Furthermore, RSRP (Reference Signal Received Power), RSRQ (Reference Signal Received Quality), or other measurement values may be used instead of the path loss.

The "data volume which can be transmitted via MSG-A" may be reported in advance to the terminal apparatus by using the broadcast information or the RRC message. The "data volume which can be transmitted via MSG-A" may be designated with a specific bit count or may be designated as TBS (Transport Block Size) which can be transmitted by a physical layer. Alternatively, a plurality of bit-counts may be set as candidates and the terminal apparatus may select one of the bit-counts on the basis of the path loss or other measurement values.

MSG-A may be a combination of the random access preamble and the PUSCH. Specifically speaking, the information included in the conventional Message 3 may be transmitted by the PUSCH which constitutes MSG-A. The PUSCH may be a different resource separated from the resource for transmitting the random access preamble.

If the data transmission continues even after the transmission of MSG-A and at least two random access preamble groups exist, the terminal apparatus can inform whether the data buffer volume which has not been transmitted is "larger than" or "smaller than" the threshold value, by using the random access preambles belonging to each group.

On the other hand, if the transmission of all data via MSG-A is completed, the base station apparatus at least does not have to inform the uplink grant via MSG-B. So, the base station apparatus according to Embodiment 1 may be configured to configure, with respect to the terminal apparatus, Group C indicating that the data buffer volume which has not been transmitted is "zero." Group C may mean that the data transmission is completed, or that it is unnecessary to allocate the uplink resources.

The information required to allocate Group C is transmitted as part of the random access control information by using the broadcast information or the RRC message. Specifically speaking, the relevant terminal apparatus can notify the base station apparatus of whether the data buffer volume which has not been transmitted is "larger than" or "smaller than" the threshold value, or is "zero," by using the random access preambles belonging to each group. Moreover, the relevant base station apparatus can determine whether the data buffer volume, which has not been transmitted, at the terminal apparatus is "larger than" or "smaller than" the threshold value, or is "zero," by detecting the random access preambles.

Figure 8:
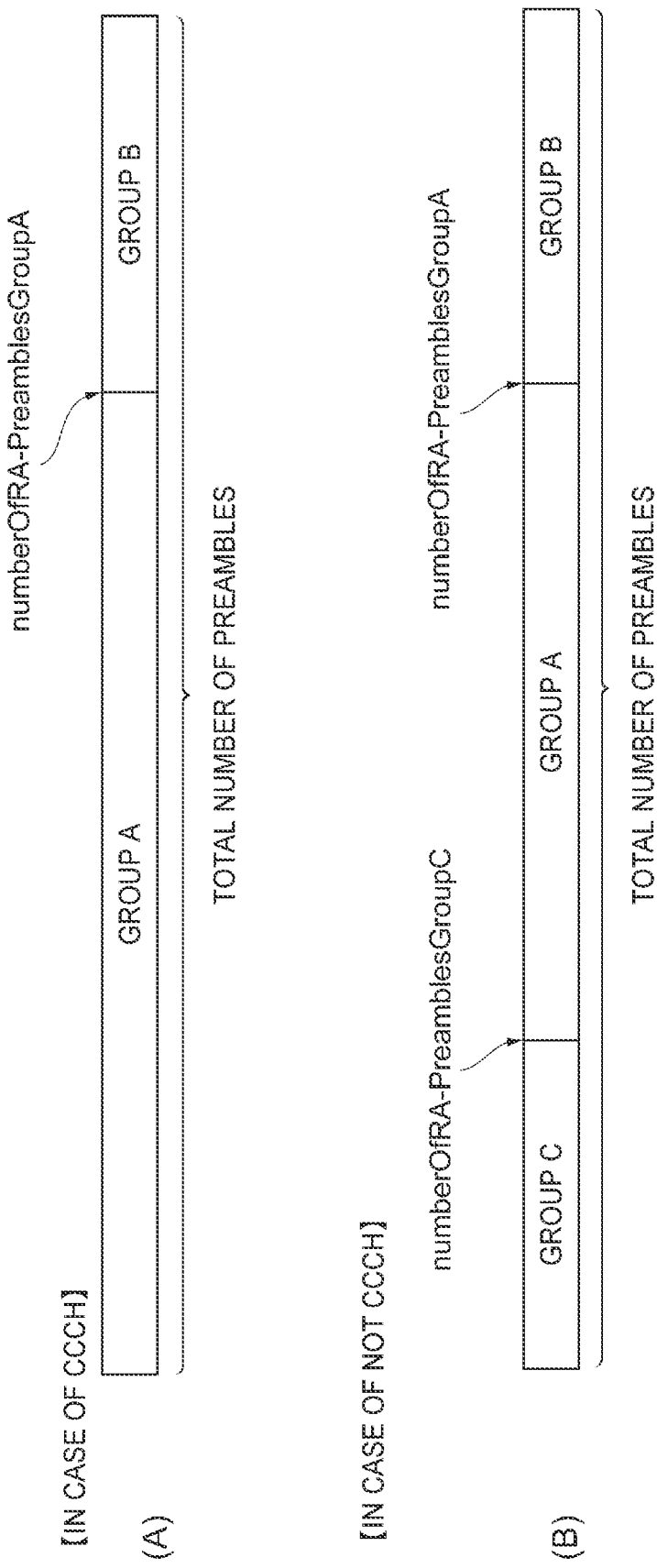
FIG. 8 is a diagram illustrating an example of the random access preamble groups according to the first embodiment of the present invention.

FIG. 8 is a conceptual diagram illustrating one example of the random access preamble groups according to the embodiment of the present invention. FIG. 8(A) is a conceptual diagram illustrating one example of the random access preamble groups when the data to be transmitted is the CCCH SDU. FIG. 8(B) is a conceptual diagram illustrating one example of the random access preamble groups when the data to be transmitted is data other than the CCCH SDU. Referring to FIG. 8(A), the terminal apparatus does not have to apply numberOfRA-PreamblesGroupC in the case of the CCCH SDU. Provided Group C is configured, the base station apparatus may set numberOfRA-PreamblesGroupA of a different value in order to change the number of preambles belonging to Group B.

Referring to FIG. 8(B), the numberOfRA-PreamblesGroupC, which is a parameter indicating a boundary between Group A and Group C, is configured in addition to the numberOfRA-PreamblesGroupA, which is a parameter indicating a boundary between Group A and Group B. The numberOfRA-PreamblesGroupC may be an index number for preambles or the number of preambles belonging to the group. Alternatively, if Group C is adjacent to Group B, the numberOfRA-PreamblesGroupC may indicate a boundary between Group B and Group C.

Furthermore, the base station apparatus may transmit, as MSG-B, both a random access response and Message 4 as one PDSCH. The base station apparatus may transmit the PDSCH, which transmits the random access response and Message 4, in different radio resource. Specifically speaking, the base station apparatus may transmit the random access response and Message 4 via another PDSCH. In this case, the random access response and Message 4 may be transmitted in the same subframe or may be transmitted in different subframes.

The base station apparatus which has detected the random access preambles belonging to Group C may not include the random access response transmitted as MSG-B or the uplink grant in Message 4. If the uplink grant is not included, the base station apparatus may use a new MAC subPDU format; and in that case, the base station apparatus sets an LCID (Logical Channel ID) indicating the new MAC subPDU format to a header for the corresponding MAC subPDU. Alternatively, the base station apparatus may indicate that the uplink grant is invalid (for example, no allocation of the uplink resources), by setting a specified bit pattern as the uplink grant. The specified bit pattern is, for example, all "0"s or "1"s.

Furthermore, the base station apparatus may set an information bit indicating that the content of the uplink grant is invalid or an instruction of the uplink grant does not have to be followed. A reservation bit of the header for the MAC subPDU may be used as the above-mentioned information bit. In this case, the reservation bit may be set as "1."

Furthermore, if the terminal apparatus which transmitted the random access preambles belonging to Group C receives the corresponding MSG-B (that is, the corresponding random access response and/or Message 4), that random access response or the uplink grant included in that Message 4 may be ignored or be determined to be invalid.

One example of random access procedure A according to Embodiment 1 will be explained below. For example, if Message A (MSG-A) has not been transmitted and Group C is configured from the base station apparatus, and (1) if the untransmitted data after the transmission of MSG-A does not exist, the terminal apparatus selects Group C.

As indicated in Procedure A below, another example of this procedure is designed that Message A (MSG-A) has not been transmitted, Group C is not configured from the base station apparatus, and Group B is configured from the base station apparatus. The terminal apparatus selects Group B if (2) the untransmitted data size after the transmission of MSG-A is larger than the MSG3 size threshold value and the path loss value is smaller than the result value of the defined calculation formula. Alternatively, the terminal apparatus selects Group B if (3) the random access procedure has initiated to transmit the RRC message which uses the CCCH and the size of the CCCH SDU after the transmission of MSG-A (the total of the size of the remaining CCCH SDU and the header) is larger than the MSG3 size threshold value.

In the case other than the above, as indicated in Procedure A below, the terminal apparatus selects Group A. Incidentally, if neither Group B nor Group C is configured, the terminal apparatus selects Group A.

One Example of Procedure A According to Embodiment 1

2> if MSG-A has not yet been transmitted:
  3> if Random Access Preambles group C is configured:
    4> if there is no potential UL data size (remaining UL data after MSG-A transmission plus MAC header and, where required, MAC CEs):
      5> select the Random Access Preambles group C.
  3> else if Random Access Pre bles group B is configured:
    4> if the potential UL data size (remaining UL data after MSG-A transmission plus MAC header and, where required, MAC CEs) is greater than ra-Msg3SizeGroupA and the pathloss is less than PCMAX (of the Serving Cell performing the Random Access Procedure)−preambleReceivedTargetPower−mvg3-DeltaPreamble−messagePowerOffsetGroupB; or
    4> if the Random Access procedure was initiated for the CCCH logical channel and the CCCH SDU size after MSG-A transmission plus MAC subheader is greater than ra-Msg3SizeGroupA:
      5> select the Random Access Preambles group B.
    4> else:
      5> select the Random Access Preambles group A.
  3> else:
    4> select the Random Access Preambles group A.

According to Embodiment 1, in the 2-step random access procedure, the terminal apparatus can notify the base station apparatus of the data size transmitted from the terminal apparatus during the random access procedure. Therefore, even in the case that the 2-step random access procedure is adopted, radio resources for the radio communication between the base station apparatus and the terminal apparatus can be utilized efficiently.

In Embodiment 2 below, descriptions about elements to which configurations similar to those of Embodiment 1 are applied are omitted and points different from Embodiment 1 will be explained in particular.

Embodiment 2

A terminal apparatus according to Embodiment 2 is configured to select a random access preamble group by using a calculation formula (threshold value) in consideration of the data volume which can be transmitted via MSG-A. Specifically speaking, if the data to be transmitted is not the CCCH SDU, the terminal apparatus according to Embodiment 2 selects a random access preamble by comparing the data buffer volume (a total of the data volume which can be transmitted via MSG-A and the untransmitted data buffer volume after the transmission of MSG-A) with a threshold value. Incidentally, if the data to be transmitted is the CCCH SDU (the RRC message), the base station apparatus can estimate an uplink resource size which is required to complete the RRC procedure and, therefore, a method for calculating the data volume does not have to be changed from the conventional method; however, the random access preamble group may be selected according to the aforementioned method.

More specifically, if the terminal apparatus initiates the 2-step random access procedure, it calculates the data buffer volume, which is buffered and has not been transmitted, and the path loss value. Then, if both Condition B1 requiring that the data buffer volume is equal to or larger than a threshold value and Condition B2 requiring that the path loss value is smaller than a specified calculation result are fulfilled, the terminal apparatus selects Group B; and in the case other than the above, the terminal apparatus selects Group A.

The base station apparatus may configure a dedicated threshold value for the 2-step random access procedure as the threshold value used for Condition B1. Moreover, in the case of initiating the 2-step random access procedure, the terminal apparatus may use, as an adjusted threshold value, a value obtained by adding a pre-defined offset value to a conventional threshold value. The pre-defined value may be a fixed value (for example, 56 bits) or a value may be configured by the base station apparatus.

One example of random access procedure B according to Embodiment 2 will be explained below. One example of this procedure is designed that Message A (MSG-A) has not been transmitted and Group B is configured from the base station apparatus. For example, the terminal apparatus selects B if (1) the untransmitted data size (for example, the total of the transmission size of MSG-A, the data buffer volume after the transmission of MSG-A, the header size, and the MAC CE) is larger than the MSG3 size threshold value and the path loss value is smaller than the result value of the defined calculation formula. Alternatively, the terminal apparatus selects Group B if (2) the random access procedure has initiated to transmit the RRC message which uses the CCCH and the size of the CCCH SDU (the total of the CCCH SDU which can be transmitted via MSG-A, the size of the remaining CCCH SDU and the header) is larger than the MSG3 size threshold value.

In the case other than the above as indicated in Procedure B below, the terminal apparatus selects Group A. Incidentally, if Group B is not configured, the terminal apparatus selects Group A.

One Example of Procedure B According to Embodiment 2

2> if MSG-A has not yet been transmitted:
   3> if Random Access Preambles group B is configured:
      4> if the potential UL data size (MSG-A and remaining UL data after MSG-A transmission plus MAC header and, where required, MAC CEs) is greater than ra-Msg3SizeGroupA and the pathloss is less than POW (of the Serving Cell performing the Random Access Procedure)−preambleReceivedTargetPower−msg3-DeltAPreamble−messagePowerOffsetGroupB; or
      4> if the Random Access procedure was initiated for the CCCH logical channel and the CCCH SDU size in MSG-A and CCCH SDU after MSG-A transmission plus MAC subheader is greater than ra-Msg3SizeGroupA:
         5> select the Random Access Preambles group B.
      4> else:
         5> select the Random Access Preambles group A.
   3> else:
      4> select the Random Access Preambles group A.

Furthermore, the terminal apparatus may be configured to inform whether the uplink data after the transmission of MSG-A (or the CCCH SDU) exists or not, by using a reservation bit in a MAC header (MAC subPDU). Specifically speaking, regarding the header configuration of R/F/LCID/L, if the reservation bit "R" is "0," it may mean that untransmitted data exists; and if the reservation bit "R" is "1," it may mean that no untransmitted data exists. Specifically speaking, if the reservation bit "R" is "1," it means that the buffer volume for untransmitted data is "zero." Incidentally, the meanings indicated by the bit may be reversed.

Furthermore, the terminal apparatus may be configured to report whether the uplink data after the transmission of MSG-A (or the CCCH SDU) exists or not, by using a new MAC CE.

According to Embodiment 2, the threshold value parameters for Message 3 (MSG3) in the 4-step random access procedure can be also used in the 2-step random access procedure in addition to the advantageous effects of Embodiment 1.

Embodiment 3

A terminal apparatus according to Embodiment 3 transmits a buffer status report MAC CE (BSR MAC CE), which is one of MAC control elements, by using MSG-A.

FIG. 9 is an explanatory diagram illustrating an example of a method for selecting a random access preamble group according to the third embodiment of the present invention. In a case that the terminal apparatus initiates the 2-step random access procedure, it calculates a data buffer volume which is buffered and has not been transmitted, and a path loss value. The terminal apparatus selects Group B if Condition C1 is fulfilled, that is, if the path loss value is smaller than a specified calculation result as illustrated in FIG. 9. Furthermore, the terminal apparatus selects Group A if the path loss value is equal to or larger than a specified calculation result. In this embodiment, the data buffer volume can be reported in detail by using the BSR MAC CE. Therefore, the condition of comparison with the aforementioned MSG3 size threshold value may be omitted, or may be added to the conditions without omitting it. If the terminal apparatus transmits MSG-A as a combination of the random access preamble and the PUSCH, it may transmit the BSR MAC CE by using the PUSCH. The PUSCH may be a resource separated from the resource for transmitting the random access preamble. Regarding the BSR MAC CE, a conventional MAC CE may be used or a dedicated BSR MAC CE for the 2-step random access may be used. Incidentally, the base station apparatus can estimate the uplink resource size which is required to complete the RRC procedure; and, therefore, if the data to be transmitted is the CCCH SDU (RRC message), the terminal apparatus does not have to transmit the BSR MAC CE, but may transmit the BSR MAC CE in order to report the detailed buffer volume.

Embodiment 3 can be combined with Group C illustrated in Embodiment 1. Under this circumstance, if Group C is configured and selected based on a specified condition, the terminal apparatus does not have to transmit the BSR MAC CE. Specifically, if the terminal apparatus selects Group A and Group B (see Cases1-4 in FIG. 9), it transmits the BSR MAC CE; and in the case other than the above (if Group C is selected), the terminal apparatus does not have to transmit the BSR MAC CE (see Case 5 in FIG. 9).

Furthermore, if Group C is not configured (or does not exist) and the untransmitted data buffer volume is zero, the terminal apparatus may set BSR=0 and transmit the BSR MAC CE. Alternatively, the terminal apparatus may implicitly indicate BSR=0 by not including the BSR MAC CE.

Figure 10:
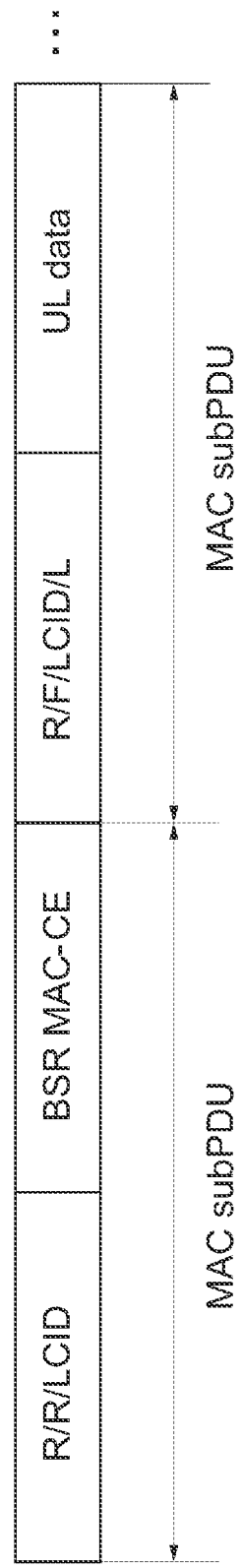
FIG. 10 is a diagram illustrating an example of the structure of a MAC PDU according to the third embodiment of the present invention.

FIG. 10 is a diagram illustrating one example of the configuration of the MAC PDU including the BSR MAC CE according to the third embodiment of the present invention. Referring to FIG. 10, the BSR MAC CE, together with a MAC subPDU header (R/R/LCID) for MAC CE, forms a MAC subPDU (a first MAC subPDU) and is located at a top of the MAC PDU. Data to be transmitted via MSG-A (UL data), together with a normal MAC subPDU header (R/F/LCID/L), forms another MAC subPDU (a second MAC subPDU) and is located at or after the first MAC subPDU.

According to Embodiment 3, the terminal apparatus transmits the buffer status report MAC CE by using MSG-A. Therefore, it is possible to increase the range of options for the method for reporting the data size to be transmitted by the terminal apparatus.

Figure 11:
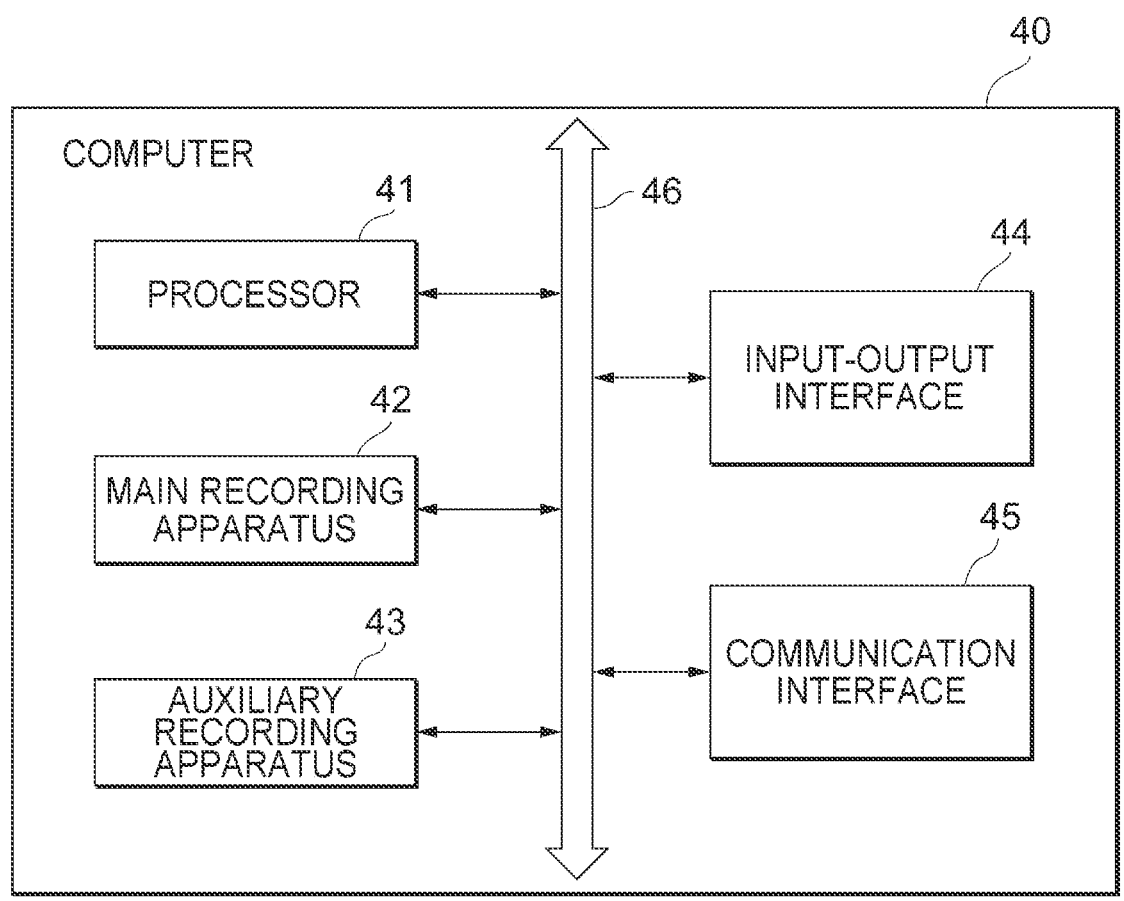
FIG. 11 is a diagram illustrating an example of a hardware configuration of a computer according to an embodiment of the present invention.

FIG. 11 is a diagram illustrating one example of a hardware configuration of a computer according to an embodiment of the present invention. Referring to FIG. 11, an explanation will be provided about one example of the hardware configuration of the computer, which can be used as the terminal apparatus 1, the base station apparatus 2, the base station apparatus 3, or the core apparatus 4 which are illustrated in FIG. 1, or to configure the terminal apparatus 1, the base station apparatus 2, the base station apparatus 3, or the core apparatus 4.

Referring to FIG. 11, a computer 40 mainly includes, as hardware resources, a processor 41, a main recording apparatus 42, an auxiliary recording apparatus 43, an input-output interface 44, and a communication interface 45; and they are connected to each other via a bus line 46 including, for example, an address bus, a data bus, and a control bus. Incidentally, an interface circuit (which is not illustrated in the drawing) may be sometimes interposed between the bus line 46 and each hardware resource as appropriate.

The processor 41 controls the entire computer. The main storage apparatus 42 provides the processor 41 with work areas and is a volatile memory such as an SRAM (Static Random Access Memory) and a DRAM (Dynamic Random Access Memory). The auxiliary storage apparatus 43 is, for example, an HDD, an SSD, and a nonvolatile memory such as a flash memory for storing programs, which are software, and data. Such programs, data, and so on are loaded from the auxiliary recording apparatus 43 to the main recording apparatus 42 via the bus line 46 at an arbitrary point in time.

The input-output interface 44 performs either one of, or both, presentation of information and reception of information input and is, for example, a digital camera, a keyboard, a mouse, a display, a touch panel display, a microphone, a speaker, or a temperature sensor. The communication interface 45 is connected to a network which is not illustrated in the drawing and transmits/receives data via the network. A wired or wireless connection can be established between the communication interface 45 and the network. The communication interface 45 sometimes also acquires information relating to the network; for example, information relating to access points and information relating to a base station apparatus which is a communication carrier.

It is apparent to those skilled in the art that, through cooperation between the above-illustrated hardware resources and software, the computer 40 can function as a desired means, execute desired steps, and implement desired functions.

Each of the above-described embodiments is for easy understanding of the present invention and does not provide a limited interpretation of the present invention. The present invention can be changed and improved without departing from its gist and also includes its equivalents.

For example, at least one of the first condition requiring that the data size is larger than the specified threshold value, the second condition requiring that the path loss value is smaller than the specified value, and the third condition requiring that the data size after the transmission of the first message is zero may be provided from the base station apparatus to the terminal apparatus and may be recorded by the recording unit for the terminal apparatus in advance.

INDUSTRIAL AVAILABILITY

According to an aspect of the present invention, the terminal apparatus, the base station apparatus, and the radio communication method which are capable of efficiently using the radio resources for the radio communication between the base station apparatus and the terminal apparatus can be provided even in the case that the 2-step random access procedure is adopted.

REFERENCE SIGNS LIST 1 terminal apparatus
2 base station apparatus
3 base station apparatus
4 core apparatus
11, 21 processing unit
13, 23 control unit
15, 25 receiver
17, 27 transmitter
19, 29 transmission/reception antenna unit
40 computer
41 processor
42 main recording apparatus
43 auxiliary recording apparatus
44 input-output interface
45 communication interface
46 bus line
111, 211 radio resource processing unit
113, 213 random-access processing unit

The invention claimed is:

1. A terminal apparatus executing radio communication with a base station apparatus, the terminal apparatus comprising:
   a transmitter that transmits a first message, including a random access preamble, for initiating a random access procedure, to the base station apparatus;
   a receiver that receives a second message, including a random access response to the first message, from the base station apparatus;

a processing unit that:
   selects one random access preamble group from among a plurality of random access preamble groups on the basis of at least one condition of a first condition requiring that a size of first data is larger than a specified value, and a second condition requiring that a path loss value is smaller than a specified value;
   selects a first random access preamble group, upon fulfilling the first condition and the second condition;
   selects a second random access preamble group, upon not fulfilling the first condition or the second condition; and
sets information indicating that a size of second data is zero in the first message, upon fulfilling a third condition requiring that the size of the second data is zero,
wherein,
upon detecting the data transmitted via a specified channel is not a service data unit of a common control channel, the processing unit that selects one random access preamble group, from among the plurality of random access preamble groups, on the basis of at least one of the first condition and the second condition,
the plurality of random access preamble groups are classified into the first random access preamble group, the second random access preamble group, and a third random access preamble group,
the processing unit that:
   judges the third condition preferentially over the first condition and the second condition;
   selects the third random access preamble group, upon fulfilling the third condition;
   selects the first random access preamble group, upon fulfilling the first condition and the second condition; and
   selects the second random access preamble group, upon not fulfilling the first condition or the second condition.

2. A terminal apparatus executing radio communication with a base station apparatus, the terminal apparatus comprising:
   a transmitter that transmits a first message, including a random access preamble, for initiating a random access procedure, to the base station apparatus;
   a receiver that receives a second message, including a random access response to the first message, from the base station apparatus;
   a processing unit that:
      selects one random access preamble group from among a plurality of random access preamble groups on the basis of at least one condition of a first condition requiring that a size of first data is larger than a specified value, and a second condition requiring that a path loss value is smaller than a specified value;
      selects a first random access preamble group, upon fulfilling the first condition and the second condition;
      selects a second random access preamble group, upon not fulfilling the first condition or the second condition; and
   sets information indicating that a size of second data is zero in the first message, upon fulfilling a third condition requiring that the size of the second data is zero,
   wherein the first message includes a BSR MAC CE (Buffer status report MAC CE) for reporting a buffer status,
   the BSR MAC CE is transmitted by using a physical uplink shared channel PUSCH (Physical Uplink Shared Channel),
   the second message includes transmission timing information and an uplink grant,
   the receiver that receives information about the size of the first data from the base station apparatus via an RRC message and
   the specified value of the path loss value is a value which is set when the random access procedure is a 2-step random access procedure.

* * * * *